(12) United States Patent
Yan

(10) Patent No.: US 10,897,406 B2
(45) Date of Patent: Jan. 19, 2021

(54) SCHEDULING METHOD FOR CONTENT DELIVERY NETWORK, AND DEVICE

(71) Applicant: Huawei Technologies Co., Ltd., Shenzhen (CN)

(72) Inventor: Wei Yan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 16/098,749

(22) PCT Filed: Jun. 13, 2017

(86) PCT No.: PCT/CN2017/088148
§ 371 (c)(1),
(2) Date: Nov. 2, 2018

(87) PCT Pub. No.: WO2018/133306
PCT Pub. Date: Jul. 26, 2018

(65) Prior Publication Data
US 2019/0140920 A1    May 9, 2019

(30) Foreign Application Priority Data
Jan. 22, 2017   (CN) .......................... 2017 1 0053963

(51) Int. Cl.
*G06F 13/00*     (2006.01)
*H04L 12/24*    (2006.01)
(Continued)

(52) U.S. Cl.
CPC .......... *H04L 41/5019* (2013.01); *H04L 29/06* (2013.01); *H04L 65/40* (2013.01);
(Continued)

(58) Field of Classification Search
CPC ..... H04L 41/509; H04L 65/80; H04L 67/327; H04L 65/40; H04L 67/1008;
(Continued)

(56) References Cited

U.S. PATENT DOCUMENTS 8,009,582 B2 *   8/2011   Mihaly .................. H04L 43/00
                                              370/232
8,638,799 B2 *   1/2014   Mudigonda ......... G06F 9/45558
                                              370/395.21
(Continued)

FOREIGN PATENT DOCUMENTS

CN        101989986 A        3/2011
CN        103746933 A        4/2014
(Continued)

OTHER PUBLICATIONS

Machine Translation and Abstract of Chinese Publication No. CN103746933, Apr. 23, 2014, 17 pages.
(Continued)

*Primary Examiner* — Kenneth R Coulter
(74) *Attorney, Agent, or Firm* — Conley Rose, P.C.

(57) ABSTRACT

A scheduling method for a content delivery network (CDN) and a device to provide a solution in which a target CDN service provider that meets a quality requirement is selected based on CDN service Service-Level Agreement (SLA) information. Therefore, scheduling flexibility of a CDN is improved, and service quality is ensured.

20 Claims, 4 Drawing Sheets

(51) Int. Cl.
*H04L 29/08* (2006.01)
*H04L 29/06* (2006.01)

(52) U.S. Cl.
CPC .............. *H04L 65/80* (2013.01); *H04L 67/10* (2013.01); *H04L 67/101* (2013.01); *H04L 67/1008* (2013.01); *H04L 67/327* (2013.01); *H04L 67/42* (2013.01)

(58) Field of Classification Search
CPC ... H04L 41/5019; H04L 67/101; H04L 67/42; H04L 29/06; H04L 67/10
USPC ........ 709/226, 229, 231–235, 217–219, 223, 709/224
See application file for complete search history.

(56) References Cited

U.S. PATENT DOCUMENTS

| | | | |
|---|---|---|---|
| 8,832,707 B2* | 9/2014 | Henderson | G06F 9/5027 709/223 |
| 2004/0117794 A1* | 6/2004 | Kundu | G06F 9/505 718/102 |
| 2007/0286085 A1* | 12/2007 | Rabinovitch | H04L 12/66 370/241 |
| 2010/0110918 A1* | 5/2010 | Mihaly | H04L 43/00 370/252 |
| 2011/0007746 A1* | 1/2011 | Mudigonda | G06F 9/45558 370/395.21 |
| 2011/0154351 A1* | 6/2011 | Henderson | G06F 9/5027 718/104 |
| 2016/0300272 A1 | 10/2016 | Ao et al. | |
| 2017/0344657 A1 | 11/2017 | Liang et al. | |
| 2019/0102717 A1* | 4/2019 | Wu | G06Q 10/06375 |
| 2019/0215361 A1* | 7/2019 | Lohmar | H04L 65/4084 |

FOREIGN PATENT DOCUMENTS

| | | |
|---|---|---|
| CN | 104320681 A | 1/2015 |
| CN | 104994123 A | 10/2015 |
| EP | 3017585 B1 | 1/2019 |
| WO | 2001089172 A2 | 11/2001 |
| WO | 2015001495 A1 | 1/2015 |
| WO | 2016082289 A1 | 6/2016 |

OTHER PUBLICATIONS

Foreign Communication From a Counterpart Application, Chinese Application No. 201780003331.2, Chinese Office Action dated Nov. 29, 2019, 13 pages.
Machine Translation and Abstract of Chinese Publication No. CN101989986, Mar. 23, 2011, 19 pages.
Machine Translation and Abstract of Chinese Publication No. CN104320681, Jan. 28, 2015, 17 pages.
Machine Translation and Abstract of Chinese Publication No. CN104994123, Oct. 21, 2015, 12 pages.
Foreign Communication From a Counterpart Application, PCT Application No. PCT/CN2017/088148, English Translation of International Search Report dated Oct. 19, 2017, 2 pages.
Foreign Communication From a Counterpart Application, European Application No. 17892316.5, Extended European Search Report dated Mar. 29, 2019, 8 pages.

* cited by examiner

SCHEDULING METHOD FOR CONTENT DELIVERY NETWORK, AND DEVICE

CROSS-REFERENCE TO RELATED APPLICATIONS

This application is a U.S. National Stage of International Patent Application No. PCT/CN2017/088148 filed on Jun. 13, 2017, which claims priority to Chinese Patent Application No. 201710053963.1 filed on Jan. 22, 2017. Both of the aforementioned applications are hereby incorporated by reference in their entireties.

TECHNICAL FIELD

The present invention relates to the field of communications technologies, and in particular, to a scheduling method for a content delivery network, and a device.

BACKGROUND

A video service operator often provides a user with a service such as video on demand or live broadcast by using CDN nodes of a plurality of CDN (Content Delivery Network, content delivery network) service providers. For a user play request, a CDN scheduling system distributes the play request to a CDN network of the video service operator or a CDN node of a CDN service provider. During scheduling, an existing CDN scheduling system usually distributes a user request to a most appropriate edge CDN node based on a user location, or distributes user requests to CDN nodes of different CDN service vendors in proportion based on a pre-configured business rule. However, this scheduling manner is relatively monotonous, and service quality of a selected CDN node is not ensured, affecting user experience.

SUMMARY

A first aspect of embodiments of the present invention provides a scheduling method for a content delivery network, including: receiving, by a scheduling system, a play scheduling request sent by a video client; determining, in response to the play scheduling request and based on at least CDN service SLA information of a plurality of CDN service providers, a target CDN service provider that meets a quality requirement; and returning information about a CDN node of the target CDN service provider to the video client, so that the video client sends a play request to the CDN node of the target CDN service provider, where the CDN service SLA information includes at least one of the following: a total quantity of user serving times, a play success rate, a play failure rate, a total quantity of user service stalling times, a user service stalling rate, an origin retrieval rate, a user download fulfillment rate, and a service reliability parameter, a play start delay compliance rate, and a download speed. In this solution, the CDN service SLA information is considered, and the target CDN service provider that meets the quality requirement is selected based on the CDN service SLA information. Therefore, quality of a service provided by the CDN node of the target CDN service provider for the video client can be ensured, and flexibility and reliability of CDN network scheduling and user satisfaction are improved.

Optionally, the scheduling system stores a scheduling rule, and the scheduling rule is configured by an administrator. The scheduling rule includes: adjusting scheduling proportions of the plurality of CDN service providers based on CDN service SLA quality parameters reported by a plurality of video clients, where the CDN service SLA quality parameters reported by the plurality of video clients include at least one of the following: a play success rate, a user service stalling rate, and a play start delay compliance rate that are in a statistical period; or adjusting scheduling proportions of the plurality of CDN service providers based on SLA indicators about access of CDN nodes of the plurality of CDN service providers to the scheduling system, where the SLA indicator about access of the CDN node of the CDN service provider to the scheduling system includes an origin retrieval rate; or adjusting scheduling proportions of the plurality of CDN service providers based on SLA service log information of the plurality of CDN service providers, where the SLA service log information includes at least one of the following: a user download fulfillment rate and a service reliability parameter.

Optionally, a scheduling proportion of a CDN service provider whose zero-stalling rate is lower than 95% in a preset time period is decreased by 10%, or a scheduling proportion of a CDN service provider whose play success rate is lower than 98% in a preset time period is decreased by 10%, or a scheduling proportion of a CDN service provider whose origin retrieval rate is higher than 15% in one statistical period or a plurality of consecutive statistical periods is decreased by 10%. The scheduling proportions of the plurality of CDN service providers can be adjusted dynamically based on the foregoing CDN service SLA information of the plurality of CDN service providers, so that a result of determining the target CDN service provider based on the scheduling proportions is more in time and more accurate.

Optionally, a CDN service provider whose numeric value of CDN service SLA information falls within a preset range in a current statistical period or a latest complete statistical period is determined as the target CDN service provider. Alternatively, a CDN service provider whose scheduling proportion in a current statistical period or a latest complete statistical period falls within a preset range is determined as the target CDN service provider; or the target CDN service provider is proportionally determined based on a quantity of play requests or play scheduling requests in a current statistical period and the scheduling proportions of the plurality of CDN service providers. Alternatively, the plurality of CDN service providers are categorized into at least two classes based on the scheduling proportions of the plurality of CDN service providers; and a CDN service provider of a preset class is determined as the target CDN service provider. The foregoing target CDN service provider is determined directly based on numeric values of CDN service SLA information, or is determined based on the scheduling proportions or the classes determined based on the CDN service SLA information. These determining manners are all based on service quality of the CDN service providers, and the determining manners are diversified and flexible.

A second aspect of the embodiments of the present invention further provides a scheduling system, configured to perform the method according to the first aspect, where the system includes: a scheduling execution center, configured to receive a play scheduling request sent by a video client; and a CDN service quality monitoring subsystem, configured to obtain CDN service SLA information of a plurality of CDN service providers, where the scheduling execution center is configured to: determine, based on at least the CDN service SLA information of the plurality of CDN service providers, a target CDN service provider that meets a quality requirement; and return information about a CDN node of the target CDN service provider to the video client, so that the video client sends a play request to the CDN node of the target CDN service provider. The system may include one or more servers, and each server includes a corresponding memory and processor.

Optionally, the scheduling system further includes: a CDN scheduling rule management subsystem, configured to receive a configuration operation performed by an administrator on a scheduling rule; and a scheduling rule library, configured to store the scheduling rule described in the foregoing method.

Optionally, the scheduling system further includes a CDN content media server, configured to: receive origin retrieval requests sent by the CDN nodes of the plurality of CDN service providers, and return media content corresponding to the origin retrieval requests.

According to a third aspect of the embodiments of the present invention, a method for obtaining media content is further provided, performed by a video client and including: receiving a play request entered by a user; generating a play scheduling request in response to the play request of the user; sending the play scheduling request to the scheduling system; receiving information about a CDN node of a target CDN service provider, where the information is returned by the scheduling system based on the play request; sending the play request to the CDN node of the target CDN service provider; and receiving a video returned by the target CDN service provider. Optionally, the video client reports a CDN service SLA quality parameter to the scheduling system, where the CDN service SLA quality parameter includes at least one of the following: a play success rate, a user service stalling rate, and a play start delay compliance rate that are in a statistical period.

A fourth aspect of the embodiments of the present invention further provides a video client, including a memory, a processor, and a computer program that is stored in the memory and that is capable of running on the processor, where the processor executes the computer program to instruct the video client to implement the method for obtaining media content.

A fifth aspect of the embodiments of the present invention further provides a scheduling system, including a memory, a processor, and a computer program that is stored in the memory and that is capable of running on the processor, where the processor executes the computer program to instruct the scheduling system to implement the method according to the first aspect.

The scheduling method for a content delivery network and the device provided in the embodiments of the present information provide a solution in which the scheduling system selects, based on the CDN service SLA information, the target CDN service provider that meets the quality requirement, where there may be a plurality of cases for the CDN service SLA information. Therefore, scheduling flexibility of a content delivery network is improved, and service quality is ensured.

DESCRIPTION OF EMBODIMENTS

Figure 1:
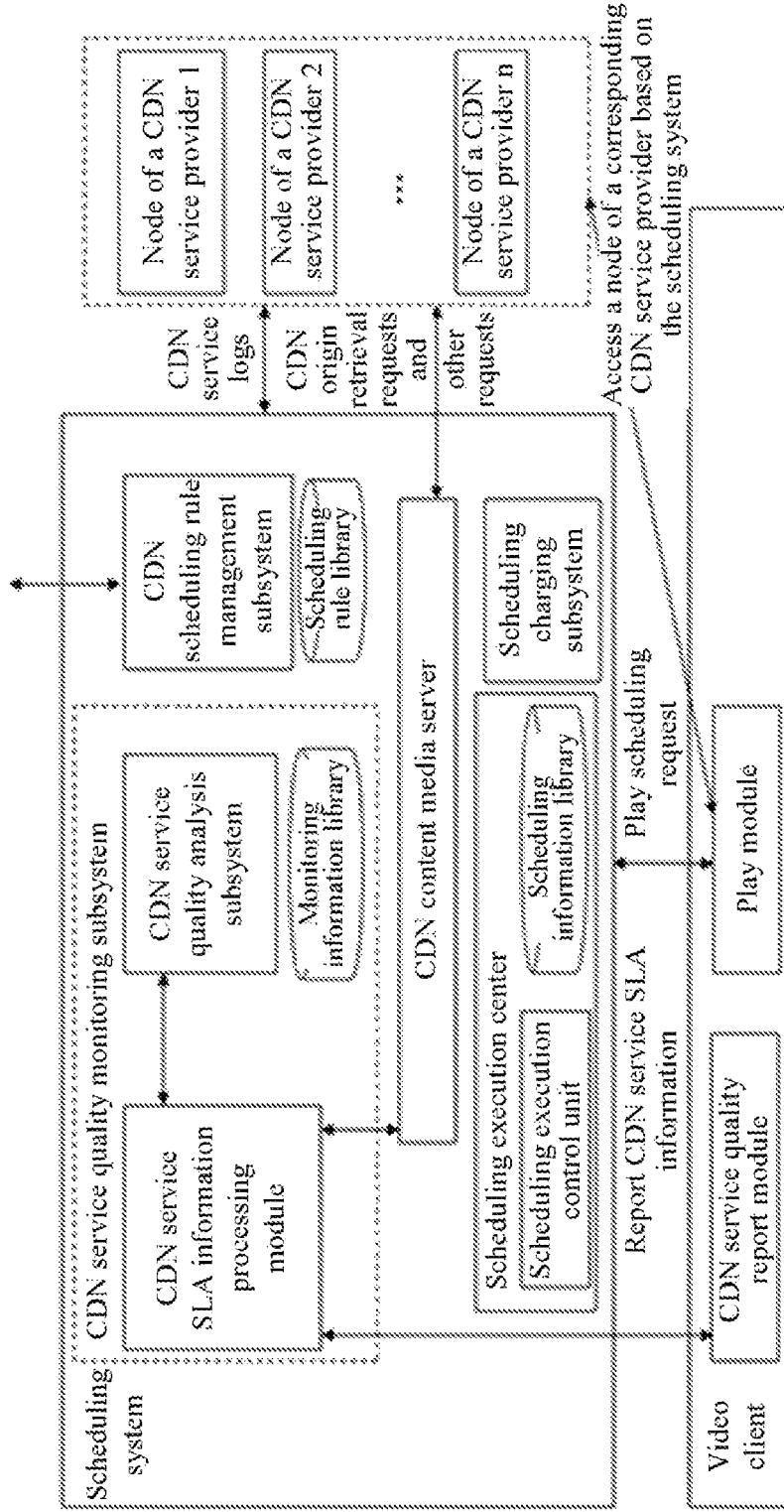
FIG. 1 is a schematic structural diagram of a part of a content delivery network according to an embodiment of the present invention.

The following describes the technical solutions in the embodiments of the present invention with reference to the accompanying drawings in the embodiments of the present invention. Apparently, the described embodiments are merely some not all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. The terms "a", "the" and "this" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items. In addition, the character "/" in this specification generally indicates an "or" relationship between the associated objects.

It should be understood that, although the terms "first", "second", and "third" may be used to describe various messages, requests, and terminals in the embodiments of the present invention, these messages, requests, and terminals are not to be limited to these terms. These terms are only used to distinguish the messages, requests, and terminals from each other. For example, without departing from the scope of the embodiment of the present invention, a first terminal may alternatively be referred to as a second terminal, and similarly, a second terminal may alternatively be referred to as a first terminal.

Depending on the context, for example, the word "if" used herein may be explained as "while" or "when" or "in response to determining" or "in response to detection". Similarly, depending on the context, the phrase "if determining" or "if detecting (a stated condition or event)" may be explained as "when determining" or "in response to determining" or "when detecting (a stated condition or event)" or "in response to detecting (a stated condition or event)".

A preset time period, a statistical period, a preset class, a preset range, the preset class, and the like in the embodiments of the present invention may be selected depending on an actual situation.

In the embodiments of the present invention, a CDN service provider is a service provider that provides CDN nodes, for example, Tencent. A plurality of nodes of the CDN service provider may provide services for one or more video service operators.

In the embodiments of the present invention, CDN service SLA (Service-Level Agreement, Service-Level Agreement) information includes at least one of the following: a total quantity of user serving times, a play success rate, a play failure rate, a total quantity of user service stalling times, a user service stalling rate (referred to as a stalling rate below), a user download fulfillment rate, an origin retrieval rate, a service reliability parameter, a play start delay compliance rate (a rate that a play start delay is within a required time), a download speed, and other information that can be used to estimate service quality. The quantity of times in the foregoing information may be a total quantity, an average value, or the like in a statistical period (which may be configured depending on a situation, for example, one day). This is not limited in the embodiments of the present invention. Optionally, the CDN service SLA information includes a user service stalling rate, an origin retrieval rate, and a play success rate. In another optional implementation, besides a user service stalling rate, an origin retrieval rate, and a play success rate, the CDN service SLA information further includes at least one of a total quantity of user serving times, a user download fulfillment rate, service reliability, and a total quantity of user service stalling times that are in a statistical time period. The user service stalling rate, the origin retrieval rate, and the play success rate have higher weights than those of other information. Optionally, information reported by a video client includes a download speed, a current network speed, a video bit rate, play failure information, stalling information, a play start delay, and the like. SLA information, reported by a CDN content media server and a scheduling execution subsystem, about access of a CDN node of a CDN service provider to a system includes an origin retrieval rate and the like. The CDN service provider may provide SLA service log information, such as a user download fulfillment rate and a service reliability parameter. Service quality of CDN service providers may be estimated by collecting statistics on CDN service SLA information of the CDN service providers in a statistical period (which may be configured depending on an actual situation). The scheduling system may select a CDN service provider of ensured service quality directly or indirectly based on the CDN service SLA information.

A scheduling rule in the embodiments of the present invention may define CDN service SLA information on which scheduling is based or CDN service SLA information on which scheduling proportion adjustment is based. The scheduling rule may be implemented in a plurality of manners. For example, the scheduling rule may be implemented based on (1) CDN service SLA quality parameters reported by video clients, for example, a parameter such as a play success rate, a user service stalling rate, or a play start delay compliance rate set for a statistical period, or (2) SLA indicators about access of CDN nodes of CDN service providers to a scheduling system, for example, an origin retrieval rate; or (3) SLA service log information of CDN service providers, for example, a user download fulfillment rate and a service reliability parameter.

In the embodiments of the present invention, scheduling proportions are proportions by which CDN service providers are scheduled, and a sum of scheduling proportions of CDN service providers that provide services for a same video service operator is 100%. For example, a total of three CDN service providers A, B, and C provide services for a video service operator, and scheduling proportions of the three CDN service providers are 30%, 40%, and 30% respectively. For a total of N play requests, a scheduling system distributes N*30% play requests to the CDN service provider A for service provision, distributes N*40% play requests to the CDN service provider B for service provision, and distributes N*30% play requests to the CDN service provider C for service provision. Further, based on the foregoing scheduling proportions, the CDN service providers may be categorized into several classes. For example, a scheduling proportion corresponding to a class 1 is 50% to 80%, a scheduling proportion corresponding to a class 2 is 30% to 50%, and a scheduling proportion corresponding to a class 3 is 10% to 30%. Initial classes and initial scheduling proportions may be set based on CDN service SLA information of the CDN service providers in a period. For example, a CDN service provider of higher quality has a class higher than that of a CDN service provider of lower quality. It should be noted that, different service prices may be determined for CDN service providers of different classes, to incent the CDN service providers to improve node service quality.

In the embodiments of the present invention, the scheduling proportions of the CDN service providers may be dynamically adjusted based on a parameter determined by using a scheduling rule. For example, the CDN service SLA information determined based on the scheduling rule is a stalling rate, and a scheduling proportion of a CDN service provider whose zero-stalling rate is lower than 95% in five consecutive days may be reduced by 10%. In an implementation, the parameter determined based on the scheduling rule is a stalling rate and an origin retrieval rate, and a scheduling proportion of a CDN service provider whose zero-stalling rate is lower than 95% or whose origin retrieval rate is higher than 15%, in one statistical period or a plurality of consecutive statistical periods, may be reduced by 10%. In another implementation, the CDN service SLA information determined based on the scheduling rule is a stalling rate, an origin retrieval rate, and a success rate, and a scheduling proportion of a CDN service provider whose zero-stalling rate is lower than 95%, or whose play success rate is lower than 98%, or whose origin retrieval rate is higher than 15%, in one statistical period or a plurality of consecutive statistical periods, may be reduced by 10%. It may be understood that, a person skilled in the art may also obtain other implementations based on the foregoing examples.

A scheduling system provided in the embodiments of the present invention selects, from a plurality of CDN service providers that provide services for a video service operator, a target CDN service provider that meets a CDN service quality requirement, so that a node of the selected CDN service provider provides a service for a user. Optionally, the scheduling system may select, based on numeric values of CDN service SLA information of the plurality of CDN service providers, a CDN service provider whose numeric value is within a first preset range (setting of the first preset range reflects the CDN service quality requirement) as the target CDN service provider. Optionally, the scheduling system may obtain scheduling proportions of the CDN service providers based on the CDN service SLA information of the plurality of CDN service providers and a scheduling rule, and then determine, based on the scheduling proportions, a CDN service provider to which a play request/play scheduling request in a period of time should be distributed. Optionally, the scheduling system may obtain scheduling proportions of the CDN service providers based on the CDN service SLA information of the plurality of CDN service providers and a scheduling rule, and then selects a CDN service provider whose scheduling proportion is within a second preset range as the target CDN service provider. Optionally, the scheduling system may obtain scheduling proportions of the CDN service providers based on the CDN service SLA information of the plurality of CDN service providers and a scheduling rule, and then obtain classes and select a CDN service provider of a preset class as the target CDN service provider. It can be learned that the scheduling system selects the target CDN service provider directly or indirectly based on the CDN service SLA information of the plurality of CDN service providers that can be used to estimate service quality of the CDN service providers.

The scheduling system may be responsible for only selecting a CDN service provider, and a specific CDN node that provides a service may be selected by the selected CDN service provider based on a policy of the CDN service provider, from nodes that provide services for the video service operator. This is not limited in the embodiments of the present invention.

Figure 2:
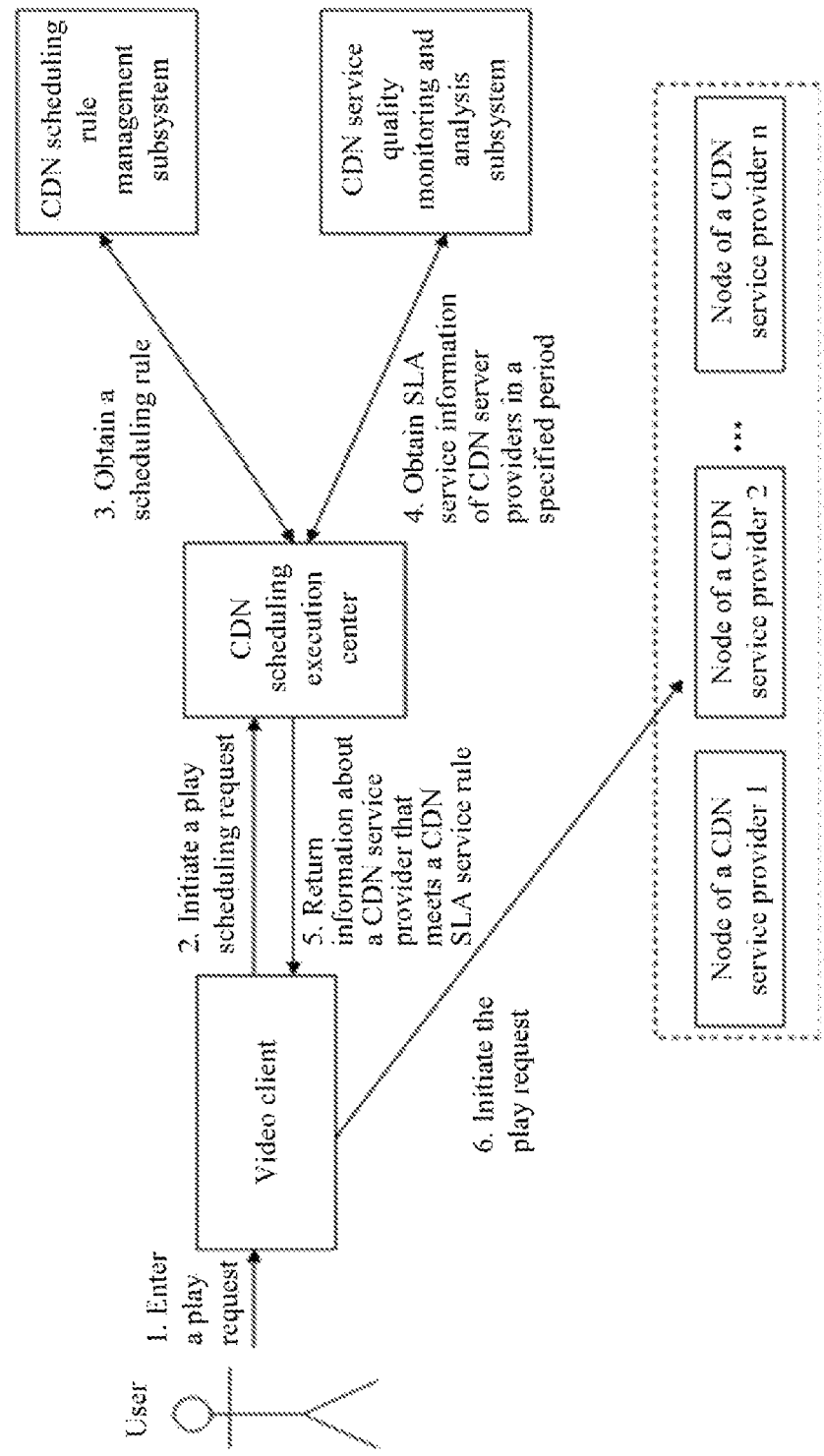
FIG. 2 is a schematic interaction diagram of a scheduling method for a content delivery network according to an embodiment of the present invention.

FIG. 1 is a schematic structural diagram of a part of a content delivery network according to an embodiment of the present invention. FIG. 1 shows a scheduling system responsible for scheduling, nodes of CDN service providers, and a video client that can be operated by a user. FIG. 2 is a schematic interaction diagram of a scheduling method for a content delivery network according to an embodiment of the present invention. A CDN content media server stores media content such as videos. When a video that a user desires to play is not cached in a node of a CDN service provider, the node of the CDN service provider needs to send an origin retrieval request to the CDN content media server to obtain the video.

The video client may be a device that provides a video service for the user, for example, a mobile phone, a tablet computer, or a palm computer. The user enters a play request by using an input interface of the video client, and a play module processes the play request, for example, sending a play scheduling request to the scheduling system. A scheduling execution center included in the scheduling system receives the play scheduling request, obtains scheduling proportions based on CDN service SLA information of the CDN service vendors that is provided by CDN service quality monitoring subsystems and a scheduling rule set by an administrator, and distributes the play request of the client to a corresponding CDN node of a target CDN service vendor, that is, returning, to the video client, information about a CDN service provider that meets a criterion. The scheduling execution center may also send, to a CDN scheduling charging subsystem, information about the current scheduling to the corresponding CDN service vendor, and the CDN scheduling charging subsystem performs charging and settlement based on the scheduling result information. The video client sends the play request to a node of the corresponding CDN service provider based on the information returned by the scheduling execution center.

Figure 4:
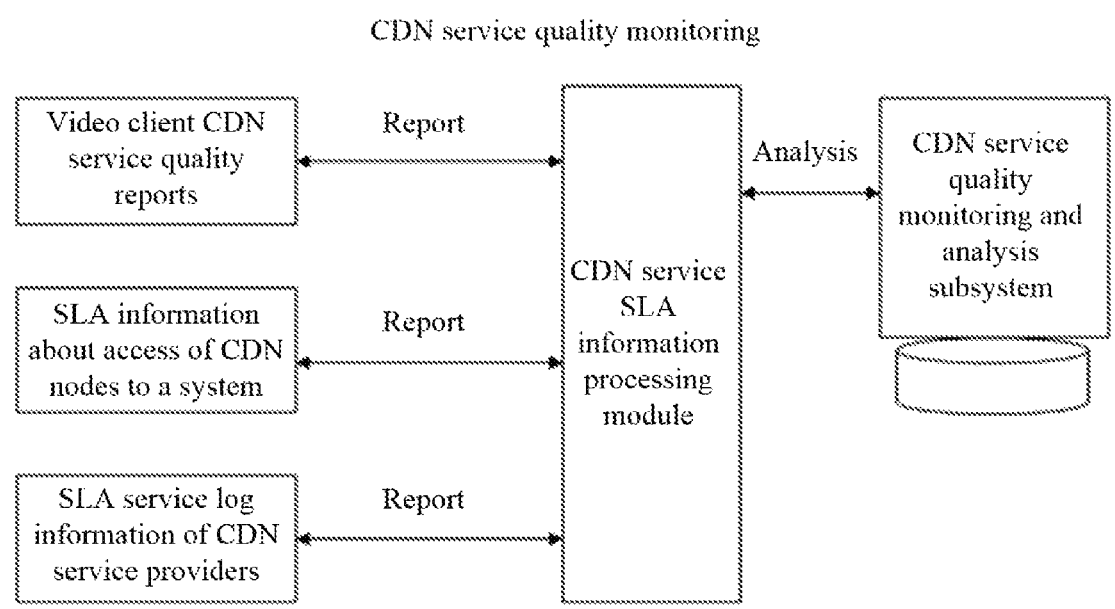
FIG. 4 is a schematic interaction diagram of CDN service quality monitoring according to an embodiment of the present invention.

The CDN service quality monitoring subsystem is shown in FIG. 4, and may include a video client CDN service quality report sub-module, and a CDN service quality monitoring and analysis subsystem. Only a part, of the scheduling system, that belongs to the CDN service quality monitoring subsystem is shown in a dashed box in FIG. 1. The CDN service SLA information of the CDN service providers may be sent by the video client CDN service quality report module, or may be obtained from SLA information, reported by the CDN content media server and the scheduling execution subsystem, about access of CDN nodes of the CDN service providers to the system, and/or SLA service log information of the CDN service providers. It may be understood that, the SLA service log information is only SLA service log information of nodes that are scheduled by the scheduling system of the video service operator, that is, nodes that provide services for the video service operator.

Figure 3:
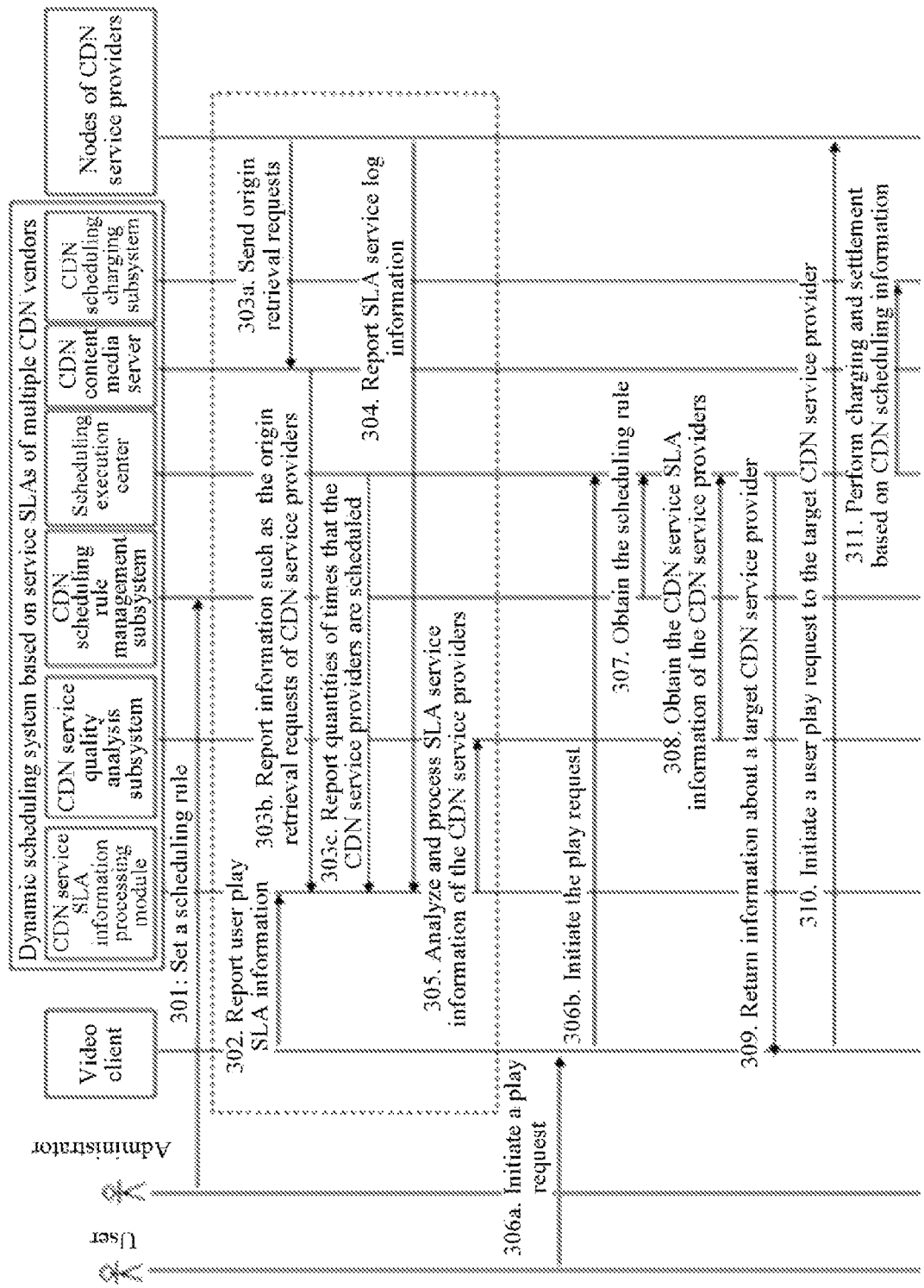
FIG. 3 is a schematic flowchart of a scheduling method for a content delivery network according to an embodiment of the present invention.

FIG. 3 is a schematic flowchart of a scheduling method for a content delivery network according to an embodiment of the present invention. Description is provided with reference to FIG. 1 and FIG. 3.

301. An administrator sets a scheduling rule by using a CDN scheduling rule management subsystem, where the scheduling rule is stored in a scheduling rule library. The setting may be flexibly designed based on CDN service SLA quality, as described in the foregoing examples. Details are not repeated herein.

302. Video client CDN service quality report modules report CDN service SLA information of CDN service providers to a CDN service SLA information processing module of a scheduling system.

303a. Nodes of the CDN service providers send origin retrieval requests to a CDN content media server, to obtain videos that are not cached on the nodes and that users desire to play.

303b. The CDN content media server collects statistics on information such as quantities of origin retrieval requests initiated by the nodes of the CDN service providers to the CDN content media server or origin retrieval rates of the nodes of the CDN service providers, and reports the information to the CDN service SLA information processing module.

303c: A scheduling execution subsystem reports, to the CDN service SLA information processing module, quantities of times that the CDN service providers are scheduled in a preset time period, where the preset time period may be set depending on time-related information.

304. The nodes of the CDN service providers report, to the CDN service SLA information processing module, service log information (including information such as user download speeds and video play bit rates of the nodes) in a preset time period, where the preset time period may be the same as or different from the preset time period in 303.

305. A CDN service quality analysis subsystem analyzes and processes the SLA information received by the CDN service SLA information processing module, to obtain CDN service SLA information (the CDN service SLA information herein is that in the foregoing examples, and details are not repeated herein) of the CDN service vendors in a statistical period.

306. A user enters a play request to a video client, and a play module of the video client initiates a play scheduling request to the scheduling execution center, where the play scheduling request is used to request the scheduling execution center to return information about a target CDN service provider.

307. The scheduling execution center obtains the scheduling rule set by the administrator from the scheduling rule library.

308. The scheduling execution center obtains the CDN service SLA information of the CDN service providers that is provided by a CDN service quality monitoring subsystem, adjusts scheduling proportions of the CDN service vendors based on the CDN service SLA information of the CDN service vendors and the scheduling rule, and then determines the target CDN service provider based on the scheduling proportions. For example, a CDN service provider whose scheduling proportion is greater than a threshold (which may be selected depending on an actual situation) in a current statistical period or a latest complete statistical period is determined as the target CDN service provider, or a CDN service provider whose scheduling proportion is less than a threshold (which may be selected depending on an actual situation) in a current statistical period or a latest complete statistical period is determined as the target CDN service provider, or the target CDN service provider is proportionally determined based on a quantity of play requests or play scheduling requests and/or scheduled play requests in a preset time period, and the scheduling proportions. Alternatively, after the scheduling proportions are determined, classes of the CDN service providers are set, and a CDN service provider of a preset class is determined as the target CDN service provider.

It may be understood that, if step 307 is omitted, the target CDN service provider may be selected by considering only the CDN service SLA information of the CDN service vendors. For example, a CDN service provider whose CDN service SLA information has a specific numeric value that is within a range (for example, whose zero-stalling rate is higher than 95%, or whose play success rate is lower than 98%, or whose origin retrieval rate is lower than 15%) in a current statistical period or a latest complete statistical period is determined as the target CDN service provider.

309. The scheduling execution center returns a message to the video client, where the message carries the information about the target CDN service provider, for example, an address of a CDN node of the target CDN service provider, or other information that can be used by the video client to find the node.

310. The video client initiates the play request to the CDN node of the target CDN service provider based on the information returned by the scheduling execution center.

The CDN node provides a corresponding video service based on the play request. For an implementation process, refer to related content in the prior art.

311. The scheduling execution center sends, to a CDN scheduling charging subsystem, information about the current scheduling to the corresponding CDN service vendor, and the CDN scheduling charging system performs charging and settlement based on the real-time scheduling result information.

It may be understood that, the foregoing method flowchart is merely an example, and some steps may be performed in other orders as required. For example, the reporting in 303c, 303d, and 404 may be performed simultaneously or in an order, and a specific order thereof does not constitute a limitation on the present invention.

Figure 5:
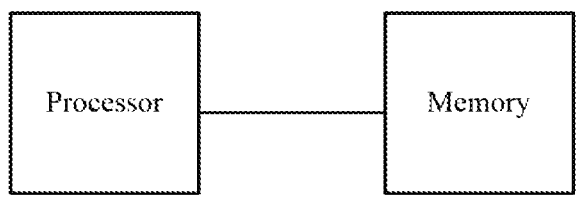
FIG. 5 is a schematic structural diagram of a video client or a server according to an embodiment of the present invention.

FIG. 5 is a schematic structural diagram of a video client or a server according to an embodiment of the present invention.

The video client includes a memory, a processor, and a computer program that is stored in the memory and that is capable of running on the processor. The processor executes the computer program to instruct the video client to complete the steps executed by the video client in the foregoing method embodiment.

The foregoing scheduling system may include one or more servers, and each server includes a memory, a processor, and a computer program that is stored in the memory and that is capable of running on the processor. The processor executes the computer program to instruct the server to complete corresponding steps.

For example, all systems and centers of the scheduling system may be implemented on one server, and a processor of the server executes the computer program to instruct the server to complete the steps executed by the foregoing scheduling system.

Alternatively, one or more of a scheduling execution center, a CDN service quality monitoring subsystem, a CDN content media server, a CDN scheduling rule management subsystem, and a scheduling charging subsystem of the scheduling system may be implemented on one server, and a processor of the server executes the computer program to instruct the server to complete the steps executed by the foregoing subsystems and/or centers.

A person of ordinary skill in the art may be aware that, the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiment. Details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses, or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected depending on actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium and includes several instructions for instructing a computer device (which may be a personal computer, a center server, a network device, or the like) or a processor (processor) to perform all or some of the steps of the methods described in the embodiments of the present invention. The foregoing storage medium includes any medium that can store program code, for example, a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A scheduling system, comprising:
a memory configured to store a computer program; and
a processor coupled to the memory, wherein the computer program causes the processor to be configured to:
receive a play scheduling request from a video client;
determine, in response to the play scheduling request and based on content delivery network (CDN) service Service-Level Agreement (SLA) information of a plurality of CDN service providers, a target CDN service provider meeting a quality requirement;
return information about a CDN node of the target CDN service provider to the video client to enable the video client to send a play request to the CDN node of the target CDN service provider, wherein the CDN service SLA information comprises at least one or any combination of a total quantity of user serving times, a play success rate, a play failure rate, a total quantity of user service stalling times, a user service stalling rate, an origin retrieval rate, a user download fulfillment rate, a service reliability parameter, a play start delay compliance rate, or a download speed;
store a scheduling rule, wherein the scheduling rule is configured by an administrator, wherein the scheduling rule comprises adjusting scheduling proportions of the CDN service providers based on CDN service SLA quality parameters received from a plurality of video clients, and wherein the CDN service SLA quality parameters comprise at least one of a play success rate, a user service stalling rate, or a play start delay compliance rate in a statistical period; and
decrease, by a first percentage, a scheduling proportion of a CDN service provider whose zero-stalling rate is lower than a second percentage in a preset time period.

2. The scheduling system of claim 1, wherein the scheduling rule further comprises adjusting scheduling proportions of the CDN service providers based on SLA indicators about access of CDN nodes of the CDN service providers to the scheduling system, and wherein an SLA indicator about access of a CDN node of a CDN service provider to the scheduling system comprises an origin retrieval rate.

3. The scheduling system of claim 1, wherein the scheduling rule further comprises adjusting scheduling proportions of the CDN service providers based on SLA service log information of the CDN service providers, and wherein the SLA service log information comprises at least one of the user download fulfillment rate or the service reliability parameter.

4. The scheduling system of claim 1, wherein the computer program further causes the processor to be configured to decrease, by a third percentage, a scheduling proportion of a CDN service provider whose play success rate is lower than a fourth percentage in a preset time period.

5. The scheduling system of claim 1, wherein the computer program further causes the processor to be configured to decrease, by a fifth percentage, a scheduling proportion of a CDN service provider whose origin retrieval rate is higher than a sixth percentage in one statistical period or a plurality of consecutive statistical periods.

6. The scheduling system of claim 1, wherein the computer program further causes the processor to be configured to determine a CDN service provider whose numeric value of CDN service SLA information falls within a preset range in a current statistical period or a latest complete statistical period as the target CDN service provider.

7. The scheduling system of claim 1, wherein the computer program further causes the processor to be configured to determine a CDN service provider whose scheduling proportion in a current statistical period or a latest complete statistical period falls within a preset range as the target CDN service provider.

8. The scheduling system of claim 1, wherein the computer program further causes the processor to be configured to proportionally determine the target CDN service provider based on a quantity of play requests or play scheduling requests in a current statistical period and the scheduling proportions of the CDN service providers.

9. The scheduling system of claim 1, wherein the computer program further causes the processor to be configured to categorize the CDN service providers into at least two classes based on the scheduling proportions of the CDN service providers, and wherein in a manner of determining the target CDN service provider meeting the quality requirement, the computer program further causes the processor to be configured to determine a CDN service provider of a preset class as the target CDN service provider.

10. The scheduling system of claim 1, wherein the computer program further causes the processor to be configured to:
receive the CDN service SLA quality parameters from the video clients;
receive origin retrieval requests from CDN nodes of the CDN service providers; and
collect statistics on origin retrieval rates of the CDN service providers based on the origin retrieval requests or receive SLA service log information from the CDN nodes of the CDN service providers.

11. The scheduling system of claim 1, wherein the first percentage comprises 10%, and wherein the preset time period comprises 5 days.

12. A scheduling system, comprising:
a scheduling execution center configured to receive a play scheduling request from a video client;
a content delivery network (CDN) service quality monitoring subsystem coupled to the scheduling execution center and configured to obtain CDN service Service-Level Agreement (SLA) information of a plurality of CDN service providers,
wherein the scheduling execution center is further configured to:
determine, based on at least the CDN service SLA information of the CDN service providers, a target CDN service provider meeting a quality requirement; and
return information about a CDN node of the target CDN service provider to the video client to enable the video client to send a play request to the CDN node of the target CDN service provider;
a CDN scheduling rule management subsystem coupled to the scheduling execution center and configured to receive a configuration operation from an administrator on a scheduling rule; and
a scheduling rule library coupled to the scheduling execution center and configured to store the scheduling rule, wherein the scheduling rule comprises adjusting scheduling proportions of the CDN service providers based on CDN service SLA quality parameters received from a plurality of video clients, wherein the CDN service SLA quality parameters comprise at least one or any combination of a play success rate, a user service stalling rate, or a play start delay compliance rate in a statistical period, and wherein a scheduling proportion of a CDN service provider whose zero-stalling rate is lower than a second percentage in a preset time period is decreased by a first percentage.

13. The scheduling system of claim 12, wherein the scheduling rule further comprises adjusting scheduling proportions of the CDN service providers based on SLA indicators about access of CDN nodes of the CDN service providers to the scheduling system, and wherein an SLA indicator about access of a CDN node of a CDN service provider to the scheduling system comprises an origin retrieval rate.

14. The scheduling system of claim 12, wherein the scheduling rule further comprises adjusting scheduling proportions of the CDN service providers based on SLA service log information of the CDN service providers, and wherein the SLA service log information comprises at least one of a user download fulfillment rate or a service reliability parameter.

15. The scheduling system of claim 14, further comprising a CDN content media server coupled to the scheduling execution center and configured to:
receive origin retrieval requests from CDN nodes of the CDN service providers; and
return media content corresponding to the origin retrieval requests.

16. The scheduling system of claim 12, wherein the first percentage comprises 10%, and wherein the preset time period comprises 5 days.

17. A video client, comprising:
a memory configured to store a computer program; and
a processor coupled to the memory, wherein the computer program causes the processor to be configured to:
receive a play request from a user;
generate a play scheduling request in response to the play request of the user;
send the play scheduling request to a scheduling system;
receive information about a content delivery network (CDN) node of a target CDN service provider from the scheduling system based on the play scheduling request request, wherein the target CDN service provider is selected based at least in part on a zero-stalling rate being lower than a first percentage in a preset time period;
send the play request to the CDN node of the target CDN service provider; and
receive a video from the CDN node of the target CDN service provider.

18. The video client of claim 17, wherein the computer program further causes the processor to be configured to report a CDN service Service-Level Agreement (SLA) quality parameter to the scheduling system, and wherein the CDN service SLA quality parameter comprises a play success rate in a statistical period.

19. The video client of claim 17, wherein the computer program further causes the processor to be configured to report a CDN service Service-Level Agreement (SLA) quality parameter to the scheduling system, and wherein the CDN service SLA quality parameter comprises at least one of a user service stalling rate or a play start delay compliance rate in a statistical period.

20. The video client of claim 17, wherein the first percentage comprises 10%, and wherein the preset time period comprises 5 days.

* * * * *

UNITED STATES PATENT AND TRADEMARK OFFICE
CERTIFICATE OF CORRECTION

PATENT NO. : 10,897,406 B2
APPLICATION NO. : 16/098749
DATED : January 19, 2021
INVENTOR(S) : Wei Yan Page 1 of 1

It is certified that error appears in the above-identified patent and that said Letters Patent is hereby corrected as shown below:

In the Claims

Claim 17, Column 14, Line 13: "request request, wherein" should read "request, wherein"

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*